United States Patent
Kallas et al.

(10) Patent No.: US 11,293,586 B1
(45) Date of Patent: Apr. 5, 2022

(54) BOOM STAND

(71) Applicants: Ryan Kallas, Bainbridge Island, WA (US); J. Herschel Blankenship, Kingston, WA (US)

(72) Inventors: Ryan Kallas, Bainbridge Island, WA (US); J. Herschel Blankenship, Kingston, WA (US)

(73) Assignee: Music Express, LLC, Kingston, WA (US)

( * ) Notice: Subject to any disclaimer, the term of this patent is extended or adjusted under 35 U.S.C. 154(b) by 0 days.

(21) Appl. No.: 16/655,930

(22) Filed: Oct. 17, 2019

Related U.S. Application Data

(60) Provisional application No. 62/746,788, filed on Oct. 17, 2018.

(51) Int. Cl.
| | |
|---|---|
| *F16M 11/10* | (2006.01) |
| *F16M 11/28* | (2006.01) |
| *F16M 11/42* | (2006.01) |
| *H04R 1/08* | (2006.01) |

(52) U.S. Cl.
CPC ............. *F16M 11/28* (2013.01); *F16M 11/10* (2013.01); *F16M 11/42* (2013.01); *H04R 1/08* (2013.01); *F16M 2200/025* (2013.01); *F16M 2200/041* (2013.01); *F16M 2200/066* (2013.01)

(58) Field of Classification Search
CPC .. F16M 11/28; F16M 11/42; F16M 2200/041; F16M 11/10; F16M 2200/025; F16M 2200/066; H04R 1/08
USPC .................................. 248/129, 188.7, 188.8
See application file for complete search history.

(56) References Cited

U.S. PATENT DOCUMENTS

| | | | | | |
|---|---|---|---|---|---|
| 975,941 | A | * | 11/1910 | Fiset ............................. | 248/129 |
| 1,593,415 | A | * | 7/1926 | Perkins .................. | F16M 11/38 |
| | | | | | 248/170 |
| 1,887,637 | A | * | 11/1932 | Hansen .................. | G03B 31/00 |
| | | | | | 381/362 |
| 2,299,683 | A | * | 10/1942 | Curtis ..................... | F21V 21/22 |
| | | | | | 248/122.1 |
| 2,479,720 | A | * | 8/1949 | Brandt ................... | G03B 15/07 |
| | | | | | 248/123.2 |
| 4,212,243 | A | * | 7/1980 | Haegermann ...... | B22D 11/1233 |
| | | | | | 101/4 |
| 4,671,478 | A | * | 6/1987 | Schoenig .............. | F16B 7/0413 |
| | | | | | 16/19 |
| 5,020,966 | A | * | 6/1991 | Kiker ..................... | B65G 60/00 |
| | | | | | 414/795.2 |
| 5,023,755 | A | * | 6/1991 | Rosenberg ............. | F16M 11/10 |
| | | | | | 248/124.1 |

(Continued)

FOREIGN PATENT DOCUMENTS

GB             617028 A   *  1/1949  ............. F16M 11/08

OTHER PUBLICATIONS

Cheetahstand, Cheetahstand Rolling Boom, May 16, 2018, https://www.youtube.com/watch?v=XfGUJ0vmVLQ. (Year: 2018).*

*Primary Examiner* — Jonathan Liu
*Assistant Examiner* — Guang H Guan
(74) *Attorney, Agent, or Firm* — J. Bennett Mullinax, LLC

(57) ABSTRACT

A large boom stand having a base with adjustable wheels that can vary the foot print size of the boom stand. The boom stand allows for height changes using pneumatically assisted lifting mechanisms that facilitate the raising and lowering of the boom arm when carrying a heavy load.

18 Claims, 16 Drawing Sheets

(56) References Cited

U.S. PATENT DOCUMENTS

| | | | | |
|---|---|---|---|---|
| 5,126,928 | A * | 6/1992 | Hughes | F16M 11/105 248/124.1 |
| 5,154,382 | A * | 10/1992 | Hoshino | F16C 11/103 248/185.1 |
| 5,184,668 | A * | 2/1993 | Fukase | B22D 11/0671 164/480 |
| 5,449,138 | A * | 9/1995 | Ciancio | F16M 11/10 248/123.2 |
| 5,470,037 | A * | 11/1995 | Willis | A61G 7/0503 248/125.9 |
| 6,019,484 | A * | 2/2000 | Seyler | F21L 14/04 362/287 |
| 6,332,621 | B1 * | 12/2001 | Wu | B62K 3/002 16/900 |
| 6,439,515 | B1 * | 8/2002 | Powers | F16M 11/28 248/129 |
| 6,517,040 | B1 * | 2/2003 | Wen | F16C 11/10 248/278.1 |
| 7,007,909 | B2 * | 3/2006 | Hsieh | F16B 7/1463 248/412 |
| 7,256,338 | B2 * | 8/2007 | Hsieh | G10D 13/063 84/421 |
| 7,926,247 | B2 * | 4/2011 | Van Den Engel | A01B 63/32 56/15.9 |
| 8,205,841 | B2 * | 6/2012 | Wood | F16M 11/2021 248/129 |
| 8,226,053 | B2 * | 7/2012 | Yu | G10G 7/00 248/122.1 |
| 9,310,021 | B2 * | 4/2016 | Hennessey | F16M 11/10 |
| 9,516,400 | B1 * | 12/2016 | Roberts | F16M 11/10 |
| 9,719,627 | B2 * | 8/2017 | Hennessey | F16M 11/28 |
| 9,961,421 | B2 * | 5/2018 | Liao | F16M 11/2021 |
| 10,082,281 | B1 * | 9/2018 | Liao | F21V 21/28 |
| 10,216,070 | B2 * | 2/2019 | Wood | G03B 17/561 |
| 10,436,426 | B2 * | 10/2019 | Thomas | F21L 14/04 |
| 10,885,888 | B2 * | 1/2021 | May | F16M 11/245 |

* cited by examiner

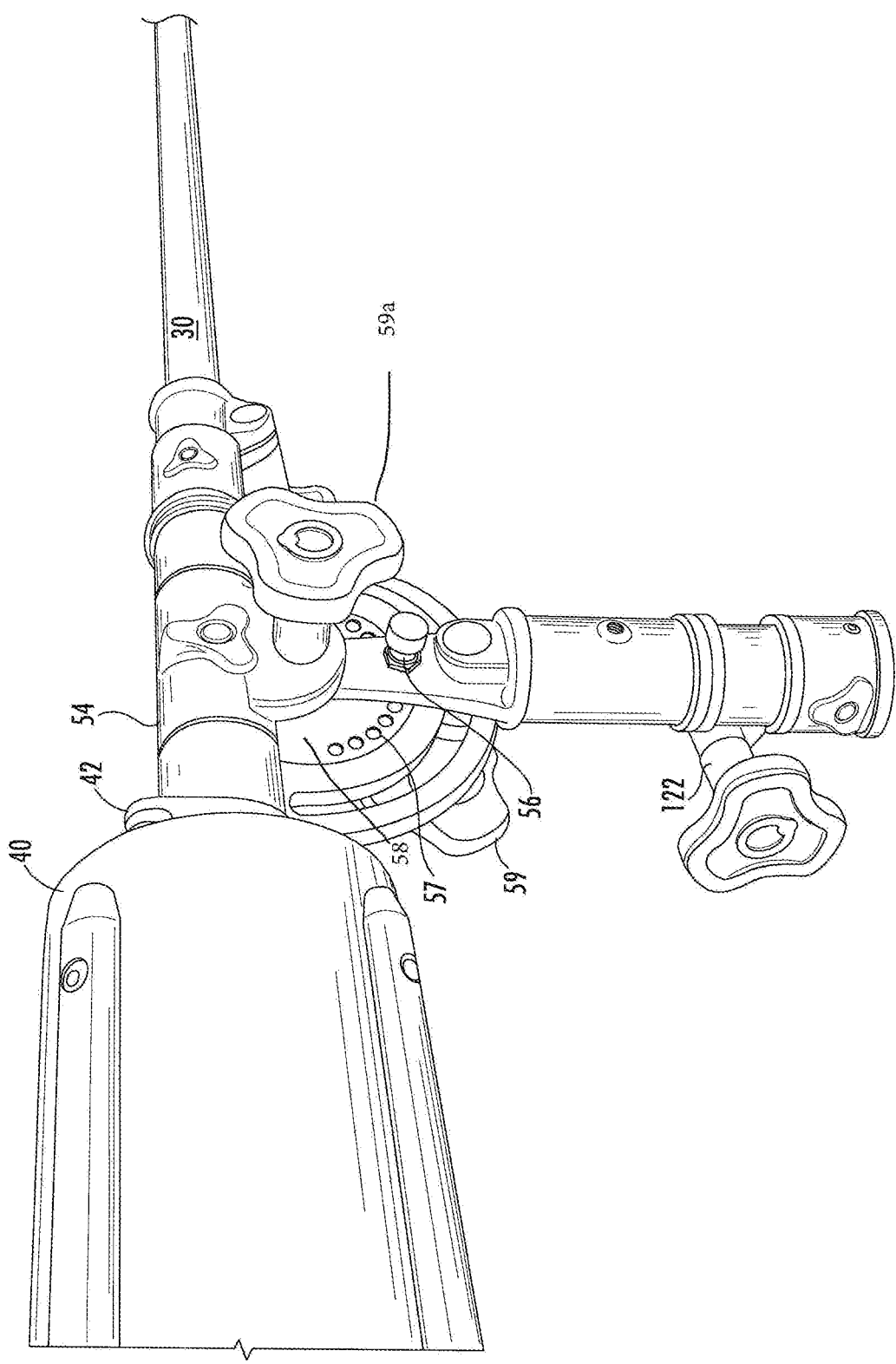

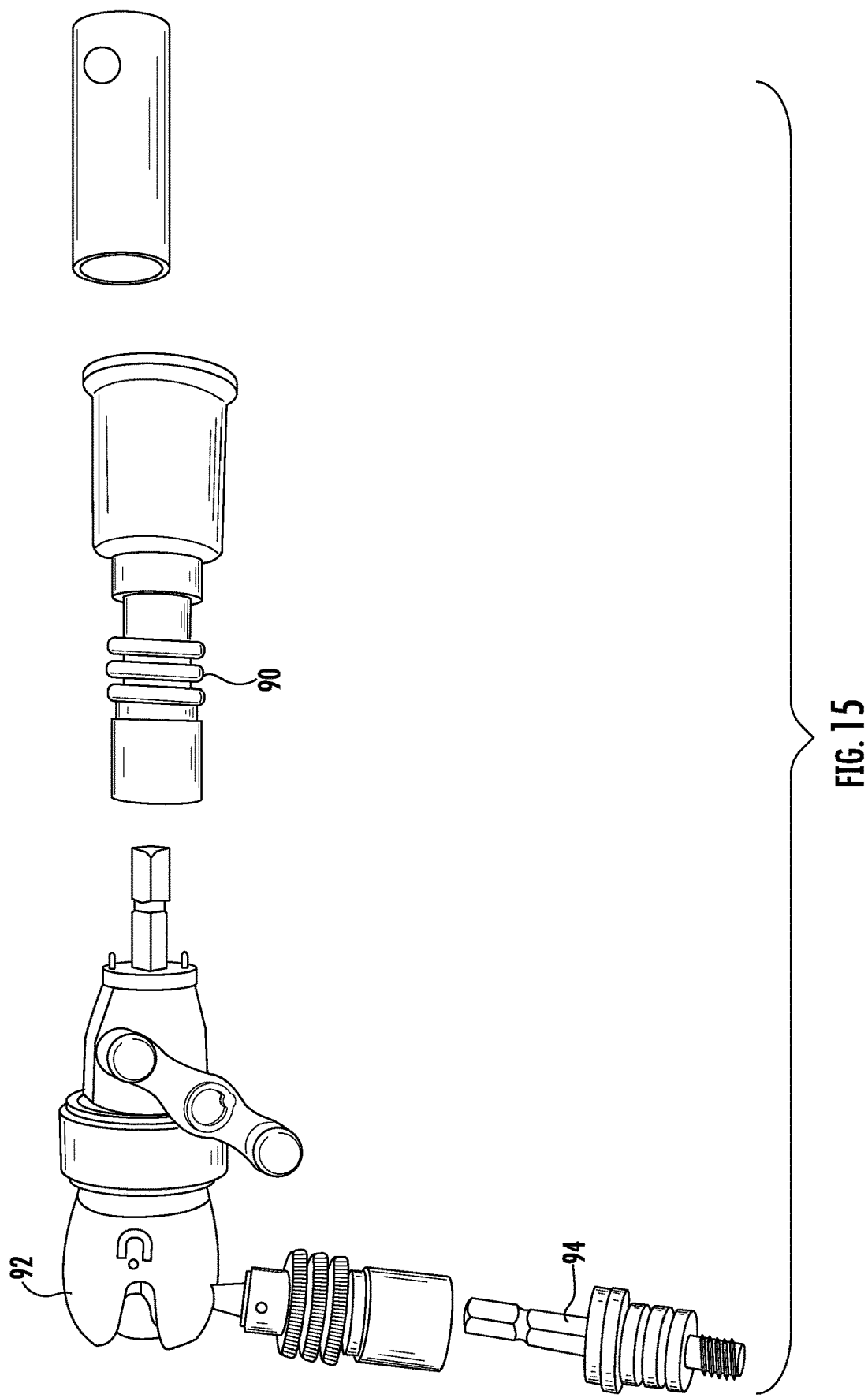

BOOM STAND

RELATED APPLICATIONS

This application claims the benefit of U.S. Provisional Application Ser. No. 62/746,788 filed on Oct. 17, 2018 and which is incorporated herein by reference.

FIELD OF THE INVENTION

This invention is directed towards a boom stand and more particularly a boom stand for use with heavy equipment including microphones and lighting. The invention provides for a large boom stand and a process of using the boom stand where the stand has a base with adjustable wheels that can vary the foot print size of the boom stand. Further, the boom stand allows for height changes using pneumatically assisted lifting mechanisms that facilitate the raising and lowering of the boom arm when carrying a heavy load. Additionally, the boom stand provides for a safety lock mechanism that allows the boom arm to be positioned at various angles relative to a vertical upright. Additionally, the boom stand provides for an adjustable counterweight on the boom arm, the counterweight being slidable along the distance of the boom arm to allow for proper balancing of equipment supported along a free end of the boom arm

BACKGROUND OF THE INVENTION

This invention relates generally to boom stand that are used for positioning of microphones and similar equipment. In order to safely balance and position equipment on the end of a boom arm, many boom stands have been provided which utilize a heavy base having a large circumferential footprint in order to maintain a stabilized equipment boom. One disadvantage of such booms are that they are difficult to move and position, the extensive foot print often interferes with other floor structures including walls or other floor supported items, in the large base makes storage more difficult. Further, conventional boom arms and equipment booms require a great deal of strength to adjust the height of the boom arm, particularly when supporting a piece of equipment and is also difficult to position the upper boom arm in terms of being balanced relative to a boom upright and being easily positioned and in a manner that allows for finding position adjustments.

Accordingly, there remains room for improvement and variation within the art.

SUMMARY OF THE INVENTION

It is one aspect of at least one of the present embodiments of the invention to provide a boom stand having a wheeled base in which the distance the wheels extend from the base can be adjusted when the boom is being positioned, move, or stored.

It is a further aspect of at least one embodiment of the present invention to provide for a boom stand, in which the vertical upright member comprises at least two pneumatic actuators which operate in concert to provide for a assisted lifting of the telescopic vertical upright and when the boom is supporting equipment.

It is a further aspect of at least one of the present embodiments to provide a boom stand comprising a locking mechanism positioned between the vertical upright and the horizontally positionable boom arm that allows for a series of locked positions of the boom arm relative to the vertical upright. The locking mechanism further comprises a pin lock which allows the boom arm to pivot or swivel within a defined plane, the pin lock being responsive to a spring mechanism which engages the pin into one of a plurality of openings within a plate of the locking mechanism.

It is a further aspect of at least one of the present embodiments of the invention to provide a boom stand having a counterweight positioned along one end of the boom arm, the counterweight adapted for sliding engagement along the boom arm and having a engageable clamp for reversibly securing and releasing the counterweight relative to a desired position of the counterweight on the boom arm.

It is one aspect of at least one of the present embodiments to provide a boom stand 10 comprising:

a vertical upright 20, the vertical upright 20 having a lower section 22 and an upper section 24, the lower section 22 defining a hollow interior and adapted for receiving a portion of a length of upper section 24 therein;

at least one pneumatic actuator 26 operationally disposed within the lower section 22;

optionally, a second pneumatic actuator 28 operatively disposed within a portion of the upper section 24 and lower section 22, the first pneumatic actuator 26 and the second pneumatic actuator 28 being in axial engagement with each other;

a clamping, member 120 secured to one end of lower section 22 and having an engaging member 122 which supplies a variable securing force to one end of upper section 24;

a locking mechanism 50 having a first tubular connector 52 adapted for receiving a free end of upper section 24, the locking mechanism 50 further defining a second tubular connector 54 positioned above the first tubular connector 52;

a telescopic boom arm 30 inserted within the second tubular connector 54, the boom arm having a sliding counterweight 40, counterweight 40 having a locking member 42 to secure the counterweight 40 to the boom arm 30, a terminal end 34 of boom arm 30 defining an attachment member for supporting a microphone;

a wheeled base 60 having at least three wheels 62, each wheel 62 secured to a first end of a corresponding leg 64 and each respective leg 64 and wheel 62 combination positioned along a pivot 67 attaching a second end of each leg to the base.

It is one aspect of, at least one of the present embodiments to provide a boom stand 10 comprising;

a vertical upright 20, the vertical upright 20 having a lower section 22 and an upper section 24, the lower section 22 defining a hollow interior and adapted for receiving a portion of a length of upper section 24 therein;

a first pneumatic actuator 26 operationally disposed within the lower section 22;

a second pneumatic actuator 28 operatively disposed within a portion of the upper section 24, the first pneumatic actuator 26 and the second pneumatic actuator 28 being in axial engagement with each other.

It is one aspect of at least one of the present embodiments to provide a boom stand 10 comprising;

a vertical upright 20, the vertical upright 20 having a lower section 22 and an upper section 24, the lower section 22 defining a hollow interior and adapted for receiving a portion of a length of upper section 24 therein;

a locking mechanism 50 having a first tubular connector 52 adapted for receiving a free end of upper section 24, the locking mechanism 50 further defining a second tubular connector 54 positioned above the first tubular connector 52;

a telescopic boom arm 30 inserted within the second tubular connector 54, the boom arm having a sliding counterweight 40, counterweight 40 having a locking member 42 to secure the counterweight 40 to the boom arm 30, a terminal end 34 of boom arm 30 defining an attachment member for supporting a microphone.

It is one aspect of at least one of the present embodiments to provide a boom stand 10 comprising;

a vertical upright 20, the vertical upright 20 having a lower section 22 and an upper section 24, the lower section 22 defining a hollow interior and adapted for receiving a portion of a length of upper section 24 therein;

a wheeled base 60 having at least three wheels 62, each wheel 62 secured to a first end of a corresponding leg 64 and each respective leg 64 and wheel 62 combination positioned along a pivot 67 attaching a second end of each leg 64 to the base 60.

It is one aspect of at least one of the present embodiments to provide a boom stand 10 comprising;

a vertical upright 20, the vertical upright 20 having a lower section 22 and an upper section 24, the lower section 22 defining a hollow interior and adapted for receiving a portion of a length of upper section 24 therein;

a locking mechanism 50 having a first tubular connector 52 adapted for receiving a free end of upper section 24, the locking mechanism 50 further defining a second tubular connector 54 positioned above the first tubular connector 52.

It is one aspect of at least one of the present embodiments to provide a process of operating a boom stand comprising:

providing a vertical upright, the vertical upright having a lower section and an upper section, the lower section defining a hollow interior and adapted for receiving a portion of a length of upper section therein;

a first pneumatic actuator operationally disposed within the lower section;

a second pneumatic actuator operatively disposed within a portion of the upper section, the first pneumatic actuator and the second pneumatic actuator being in axial engagement with each other;

releasing a mechanism that retains the upper section within the hollow interior of the lower section;

raising the upper section by the operation of the first pneumatic actuator and the second pneumatic actuator which exert an upwardly directed force thereby extending a portion of the length of the upper section of the vertical upright;

engaging the locking mechanism when the height of the upper section of the vertical upright is in a desired position.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIG. 4 is a perspective view of the boom, arm including the locking mechanism and a counterweight.

FIG. 15 is a perspective view of various connectors that may be attached to an end of the boom arm.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5. The term "about" means+/−10% of the stated value unless a different range is specified.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

As used herein, the term "pneumatic actuator" refers to a pneumatic tensioned lift mechanism that provides lifting assistance. Such pneumatic actuators are typically cylindrical in design but other shapes could be utilized, Pneumatic actuators are known in the art and widely used in the automotive industry to provide lifting assistance with respect to hatchback doors, engine hoods, and are utilized in adjustable chair designs and a variety of industrial applications.

Figure 1:
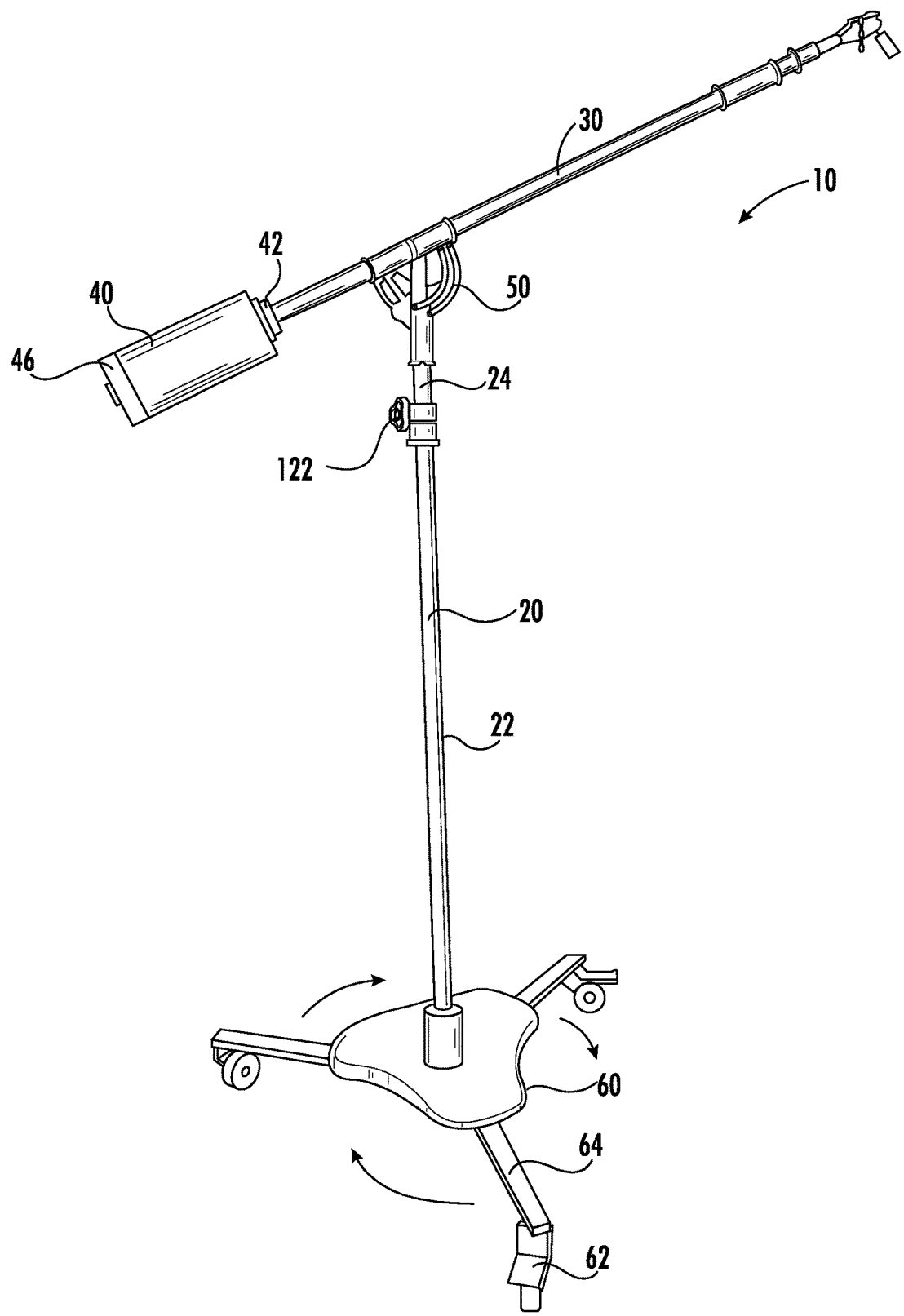
FIG. 1 is a perspective view of a boom stand in accordance with the present invention.
Figure 2:
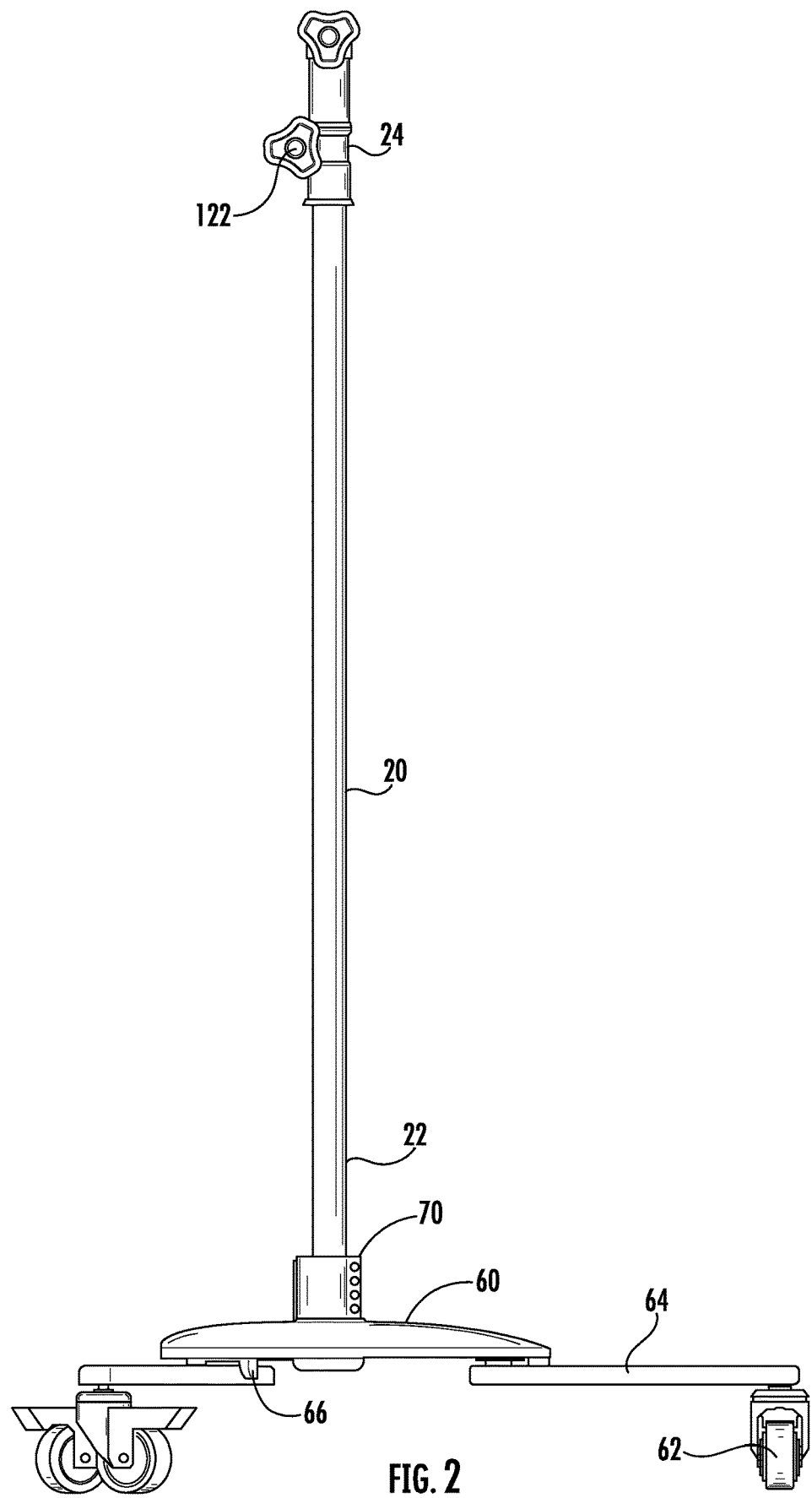
FIG. 2 is a perspective view, partially dissembled, of components of the boom stand seen in FIG. 1.

As seen in reference to FIG. 1, a boom stand 10 is provided. The boom stand provides a base 60 which has a plurality of legs 64 secured to a lower surface of base 60. A pivot attachment 67 is used to secure one end of each leg 64 to a lower surface of the base and which allows leg 64 to be extended from a first position perpendicular to an edge of the base to a second storage position where the wheel 62 and leg 64 are positioned under the base. A plurality of stop members 66 can be supported by a lower surface of the base to limit the pivoting movement of each leg 64. The legs and wheels can be pivoted along the defined pathway while the stand is assembled. This allows for on-site adjustments to the overall foot print of the boom stand to accommodate placement of the boom stand relative to other items in the immediate floor space or environment.

As further seen in reference to FIGS. 5A, 5B, and 7-19, the base 60 further defines a plurality of locking pins 69 which can be used to secure each associated leg to a fully extended and locked position relative to the base. The spring loaded locking pin 69 allows for the automatic engagement of the pin when a corresponding aperture of the leg is aligned with the corresponding base aperture and pin 69. Upon the manually release of pin 69, each leg can thereafter be rotated in a counter-clockwise position so as to return the leg to a second storage position or a desired intermediate positioned between the fully extended and the stored position.

As seen in FIG. 1, an illustrated embodiment of the wheels 62 use swiveling and lockable castors to facilitate the support and movement of the boom stand. However, other forms of wheels can be used including metal rollers or ball bearing rollers.

Positioned along an upper surface of the base 60 is a collar 70 which adapted for receiving a first terminal end 24 of a vertical upright 20. Collar 70 provides for an adjustable clamping force, such as a plurality of screws or bolts, to tighten the inner circumference of collar 70 against the outer circumference of the engaged vertical upright 20.

Vertical upright 20 further includes a lower section 22 and an upper section 24, the lower section 22 defining a hollow interior and adapted for receiving a portion of the length of the upper section 24 therein in a telescopic manner. As seen in reference to FIGS. 6, 10, and 11, a first pneumatic actuator 26 may be operatively positioned within the interior of lower section 22 and a second pneumatic actuator 28 is positioned within the interior of a lower section 22 and which engages a base of upper section 24 of vertical upright 20. While in the illustrated embodiment, a first pneumatic actuator 26 and a second pneumatic actuator 28 are illustrated, it is possible that only a single actuator be used or three or more actuators be utilized depending upon the desired height, load capability, diameter requirements for the upright sections 22 and 24, and other design considerations. In some embodiments, at least a portion of a second pneumatic actuator 28 can extend within the hollow interior of the upper section 24, In the embodiments described herein, the respective terminal ends of the actuators are fixed to a location within the respective sections 22 and/or 24 such that the pneumatic force exerted by the actuators collectively work to move the relative sections 22 and 24 in a telescopic manner.

The first and second actuators, 26 and 28, are designed to each exert an axially directed upward force and to work in concert with the other. In some embodiments, it has been found useful to have the lower actuator 26 to provide a lifting force which is greater than the lifting force provided by the second actuator 28. In other embodiments, the respective first and second actuators can have different amounts of a pneumatic lifting force. In use, a clamping member 120 is secured to one end of the lower section 22 and has an engaging member 122 which engages and secures upper section 24. Upon the release of the engaging member 122, the actuator 26 and 28 will provide an upper force that facilitates the lifting of the telescopic upper section 24 and accessories that are connected and responsive thereto.

Figure 6A:
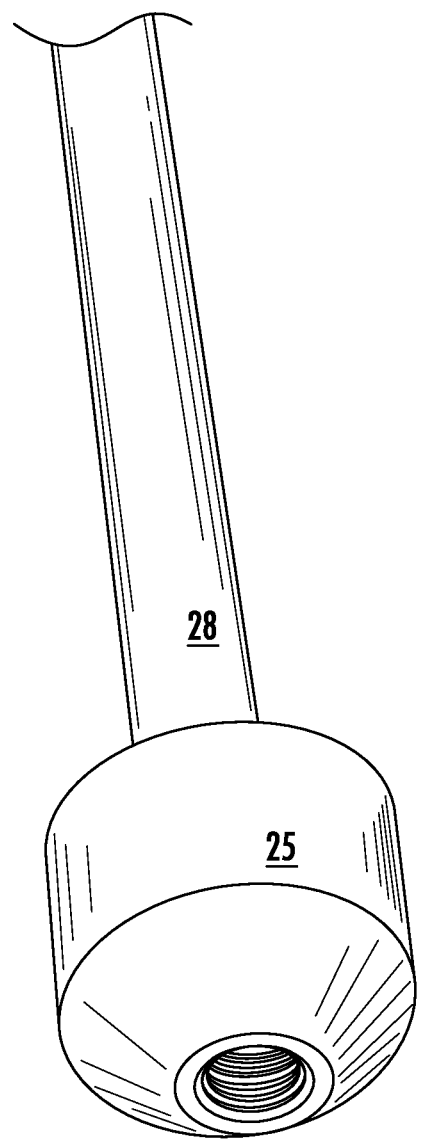
FIGS. 6A & 6B sets forth various embodiments of connectors used to secure respective ends of pneumatic lift arms to the adjacent lift arm mechanism.
Figure 6B:
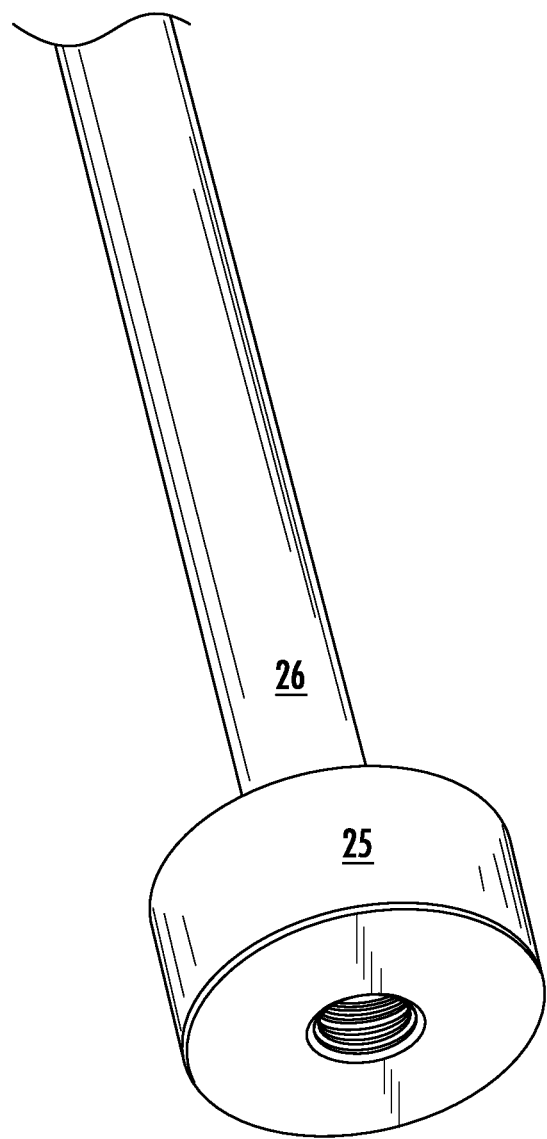
Figure 7:
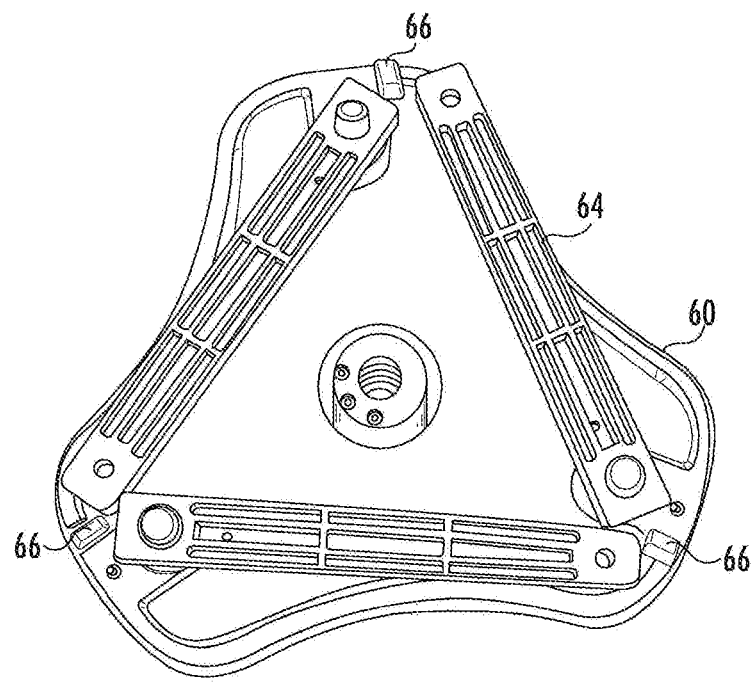
FIG. 7 is 2 view of a bottom of the base showing the pivoting legs in a non-extended storage position.
Figure 8:
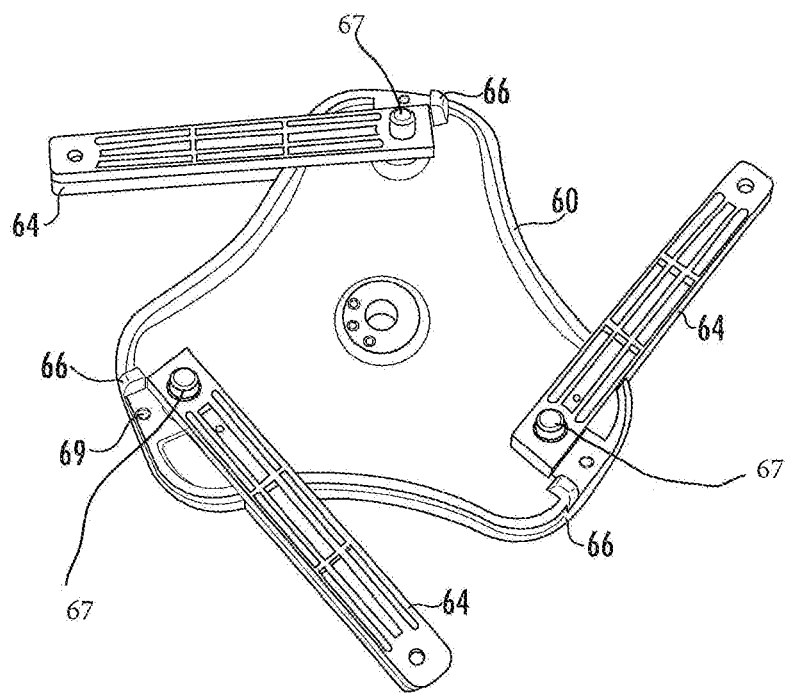
FIG. 8 is a view similar to FIG. 7 showing the legs partially pivoted and extending beyond the perimeter of the base.
Figure 9:
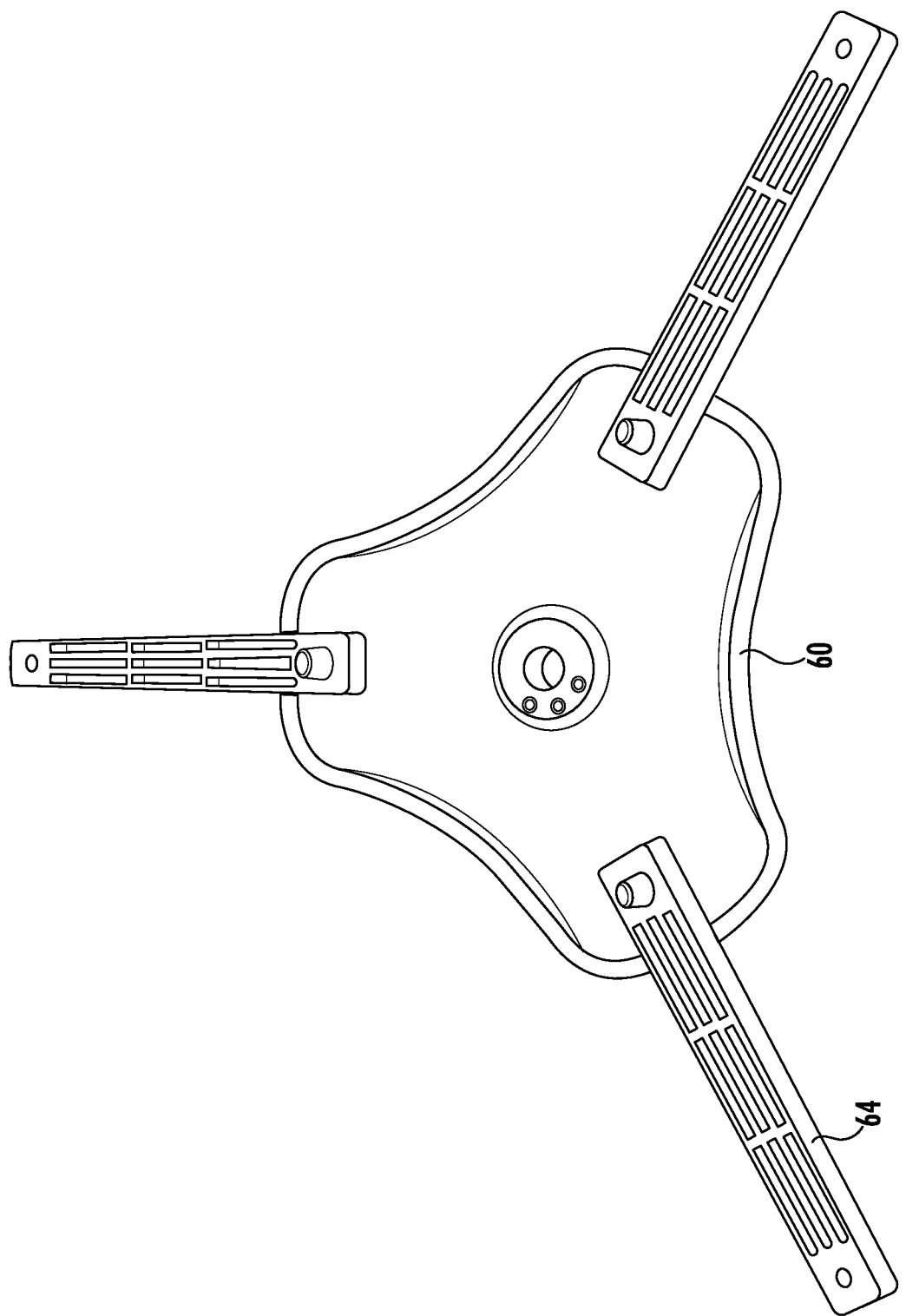
FIG. 9 is a view similar to FIGS. 7 and 8 showing the legs in a fully extended and locked position relative to the base.
Figure 10:
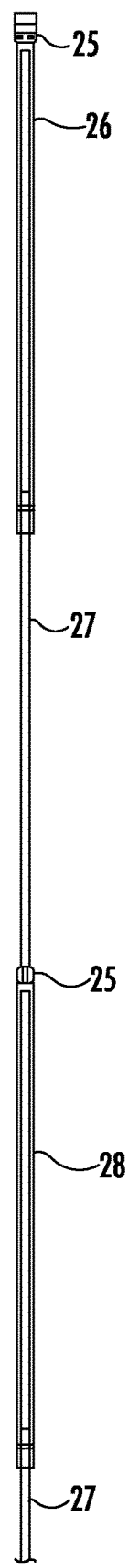
FIG. 10 is a view of a pneumatic actuator lift arm used in accordance, with the present invention.
Figure 11:
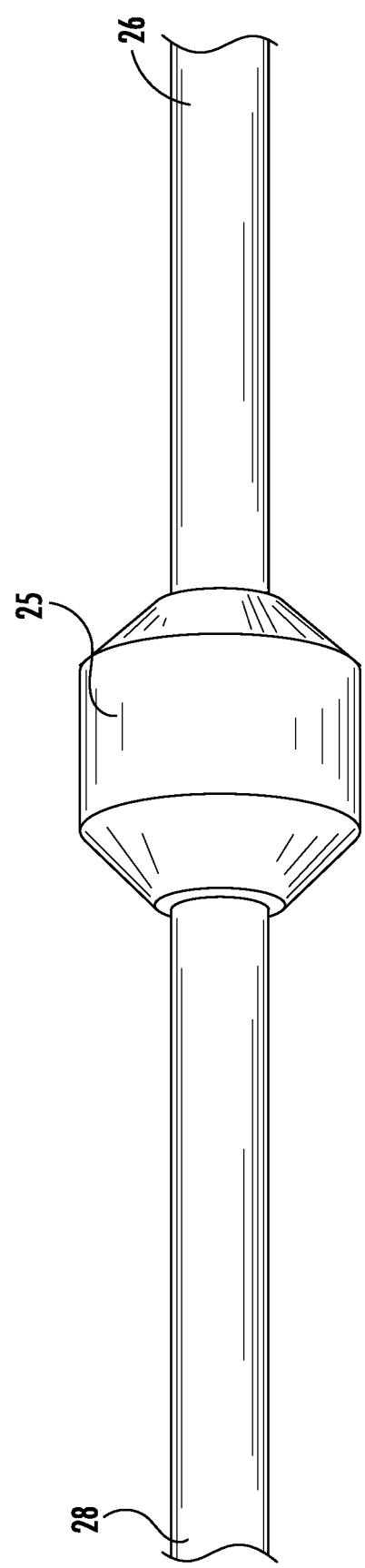
FIG. 11 illustrates details of pneumatic actuator lift arms secured to a connector.
Figure 12:
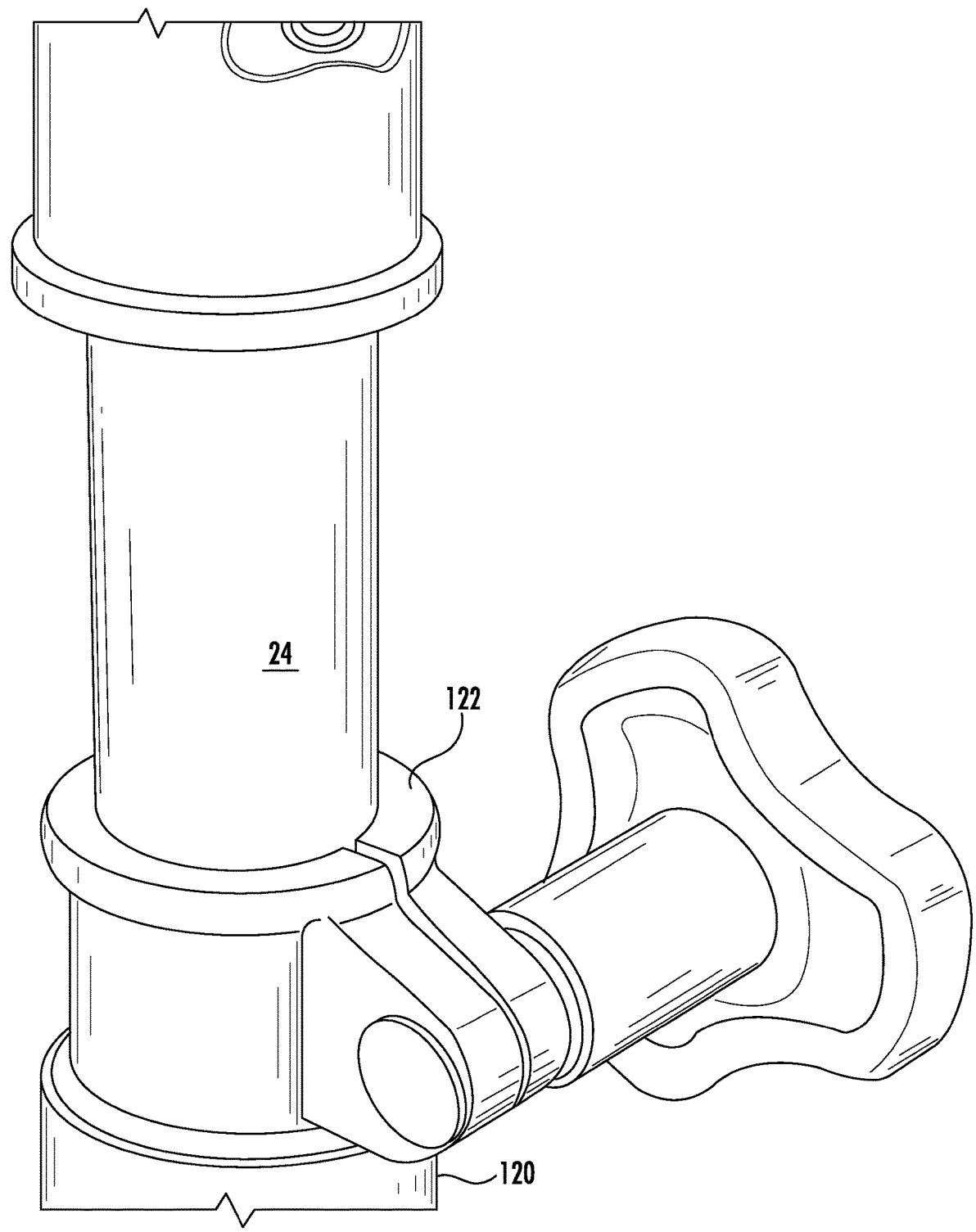
FIG. 12 is a perspective view of a clamping member and an engaged member used to secure a lower vertical upright to a telescopic upper member of the vertical upright.
Figure 13A:
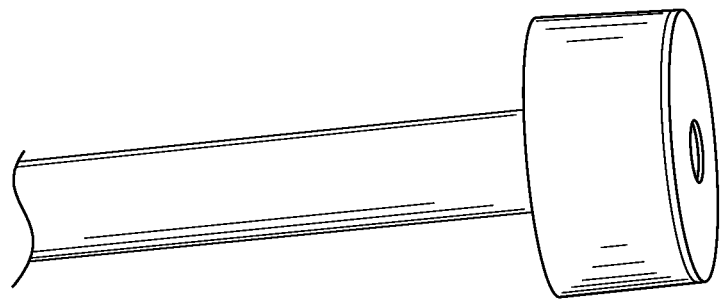
FIG. 13A is a perspective view illustrating a connector which may be used to secure an actuator within a vertical upright.
Figure 13B:
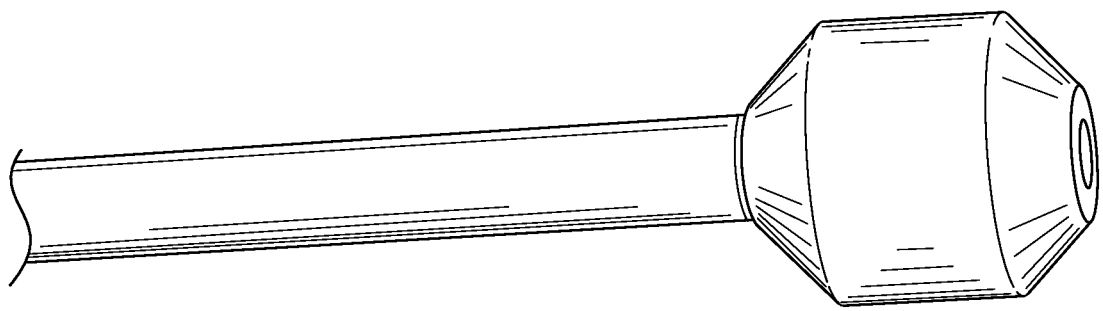
FIG. 13B is a perspective view illustrating a connector which may be used to secure similar free ends of an actuator when a coupled arrangement within a vertical upright.

As best seen in reference to FIGS. 6A and 6B, respective ends of the telescopic portions 27 of the first and second actuators 26 and 28 can have various styles of connecting joints attached thereto. In some embodiments, a cylindrical connector may be used to connect a base of one of the actuators to desired location within the lower section 22. Alternatively, the connectors 25 seen in FIGS. 6A and 6B could also be used to secure a terminal end of a telescopic rod of one connector to either the telescopic end of a second connector or the telescopic end of a base of the second actuator. Each end of connector(s) 25 may be threaded to receive an appropriate mated end of an actuator 26 or 28.

Depending upon the end performance characteristics, it is possible to use the first and second actuators in at least three different configurations. A first configuration has the telescopic position of a lower actuator 26 engaging the base of the second, upper actuator 28. In an alternative arrangement, the two actuators 26 and 28 are positioned in an opposite orientation, such that the telescopic end of the lower most actuator is attached to a base of the lower section 22. A third alternative arrangement has the respective telescopic portions of the first and second actuator joined together such that the upper actuator is oriented in a configuration opposite the lower actuator. One such connector 25 can be seen in FIG. 11.

In accordance with this invention, it has been found that a lifting force of actuator 28 between a range of about 10# to about 20# is useful and a lifting force of actuator 26 between about 10# and about 20# is useful. Depending upon the support load, the actuator may physically displace the upper boom arm 24 or, at a minimum, reduce the amount of manual lifting force a user needs to provide. Similarly, when lowering the boom arm height, a combination of the overall boom arm supported weight and any downwardly directly manual pressure from an operator will lower the upper boom arm and which can be secured in a desired position by reengaging the engaging member 122 of clamping member 120.

Figure 14:
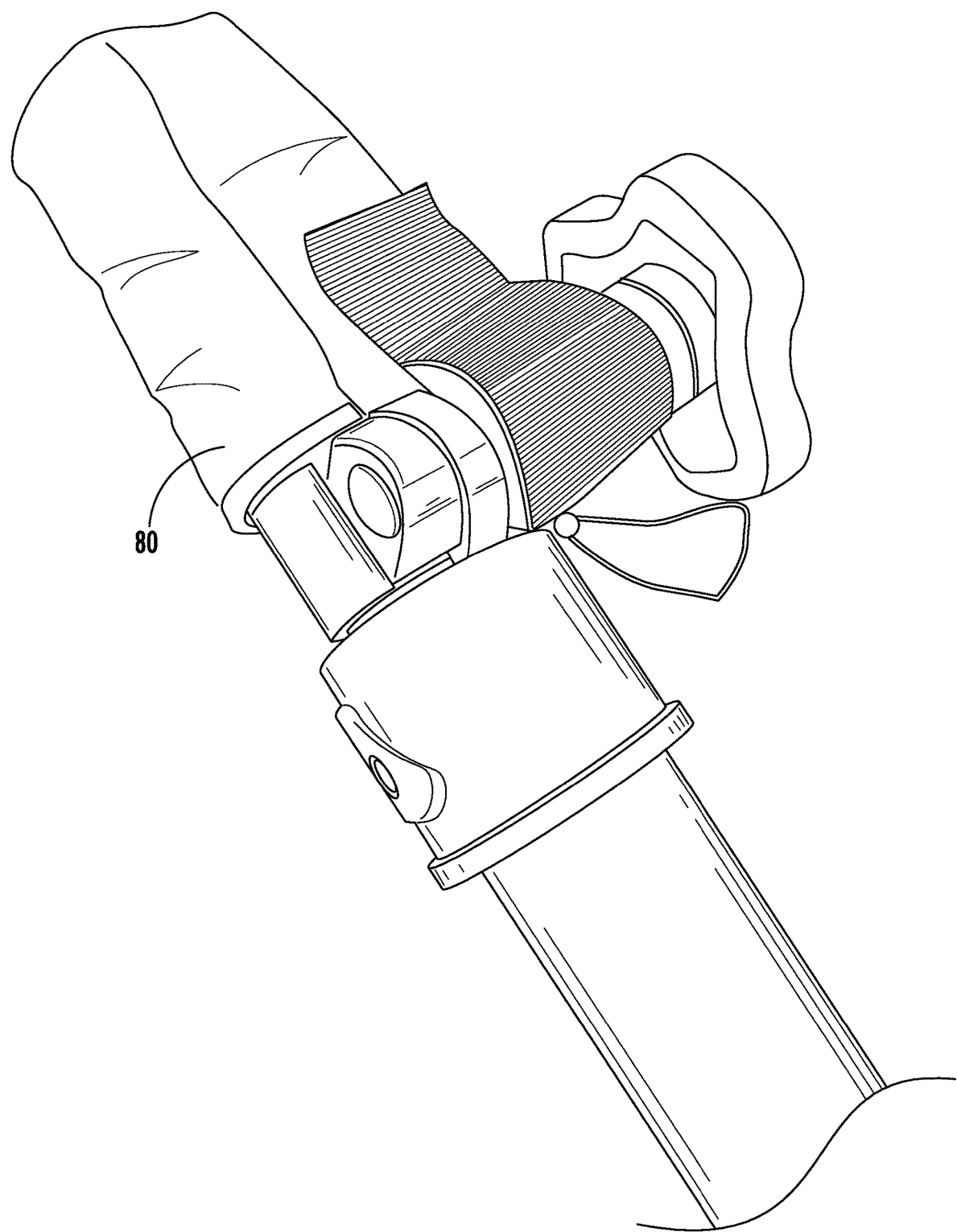
FIG. 14 is a perspective view of a fabric cap secured to a vertical upright.

As further seen in reference to FIG. 14, a protective cap 80 can be installed over a terminal end of the upper section 24 that is in turn fastened to portion of the clamping member 120. One such form of the cap 80 is in the form of a fabric cover in which strips of hook and loop fasteners are used to secure the cover to the clamping member 120. This safety mechanism provides a physical protection and a visual reminder that the lifting force by the actuators is such that the clamping member 122 should be tightly engaged prior to releasing the protective cap 80. In this manner, once the cap 80 is removed, loosening the engaging member 122 may be done in a controlled fashion, thereby slowing the upward movement of the upper section 24.

Figure 3:
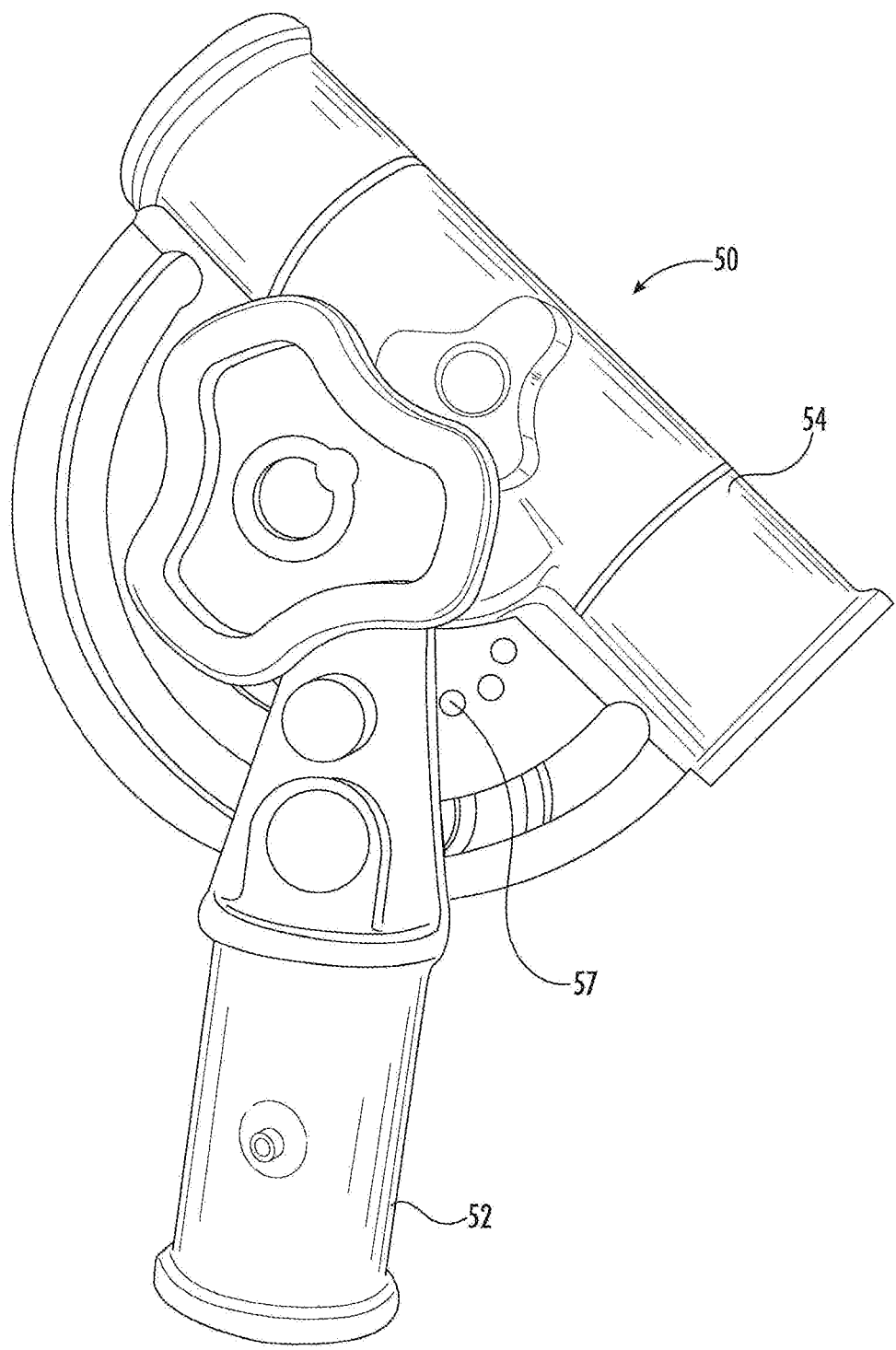
FIG. 3 is a perspective view of a locking mechanism used to position a boom arm relative to a vertical upright support.
Figure 5A:
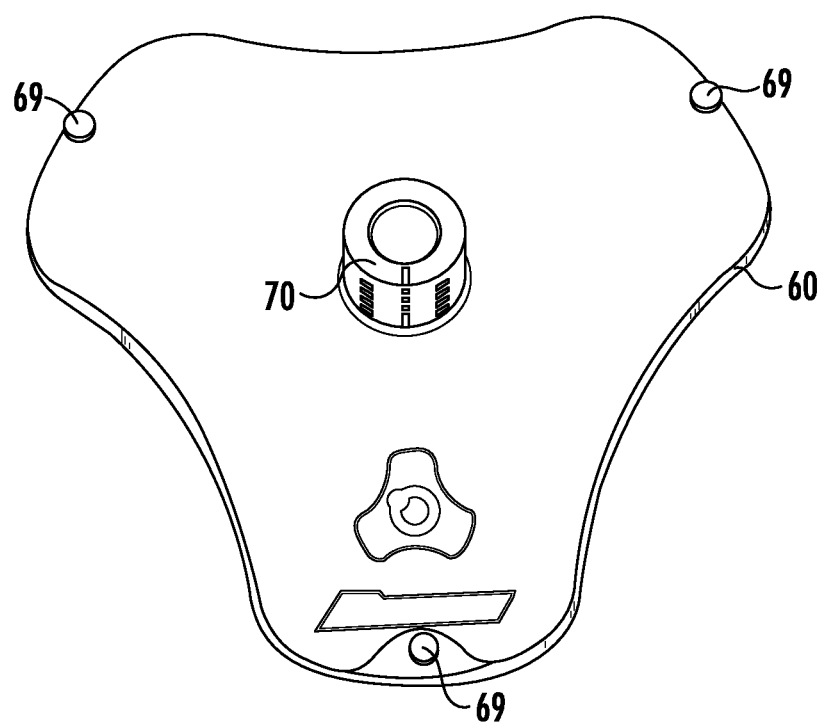
FIGS. 5A & 5B are perspective views of details of a base of the boom stand.
Figure 5B:
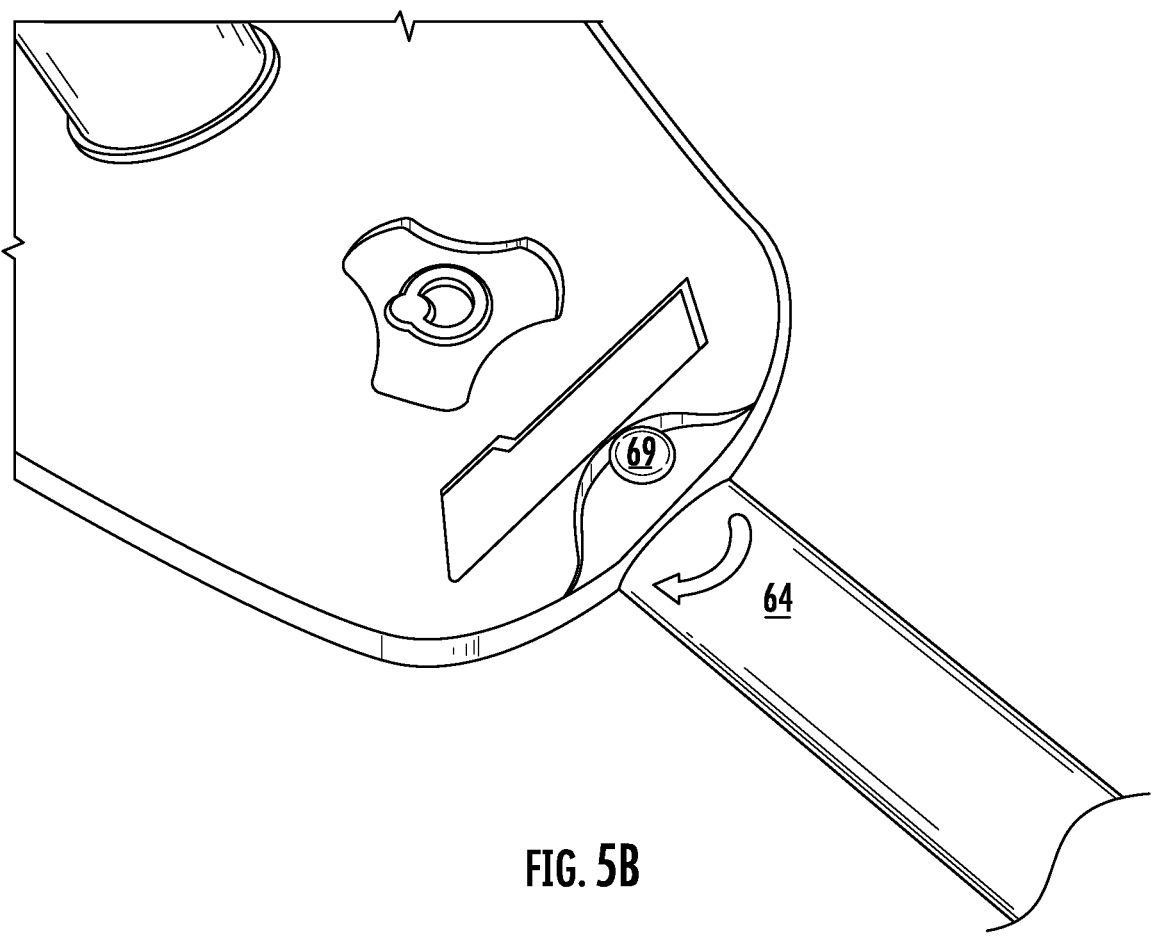

As seen in FIGS. 1, 3, and 4, an upper end of upper, section 24 engages a locking member 50 by a tubular connector 52. A second tubular connector 54 is supported along an upper portion of locking member 50 and allows for the sliding engagement of the boom arm 30 therein. As seen in reference to FIGS. 3 and 4, the locking member 50 defines a plurality of spring tensioned pins 56 which will engage any of a plurality of apertures 57 defined within an adjacent plate 58.

As seen in reference to FIG. 4, the locking member 50 allows the pivoting movement of boom arm 30 by the position of the pins within the aperture. Handle 59 will engage a clamping member to allow an additional securing force to the locking member 50 to prevent pivoting, motion of the boom arm.

Additionally, the connector 54 allows for the position of the boom arm 30 to be slidably adjustable within the connector 54 for additional adjustments to the position of the boom arm. The boom arm 30 may be moved and secured to a desired position within a tubular portion of the connector 54 using a screw/handle tensioned fastener 59a.

Figure 16A:
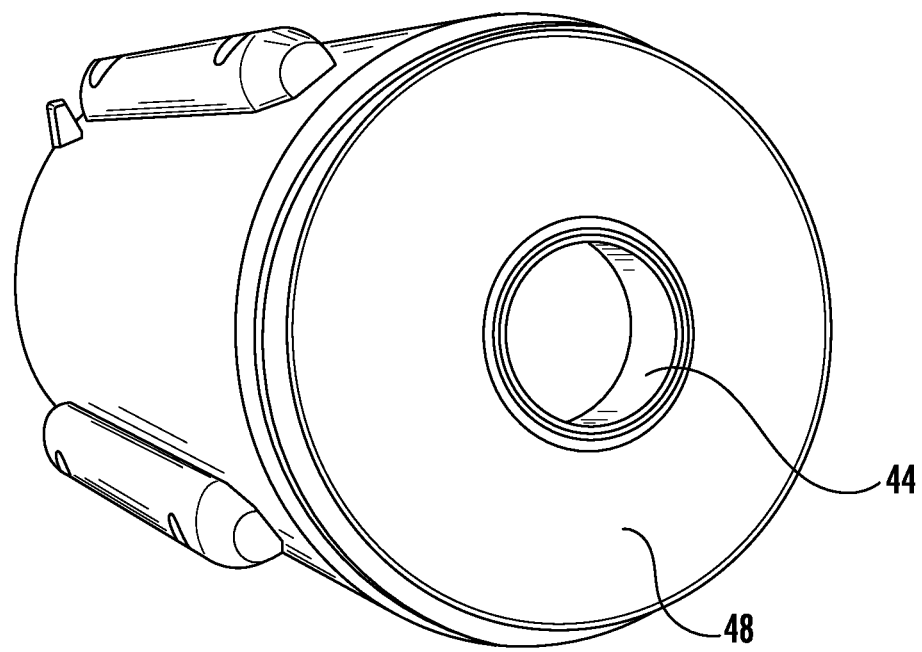
FIG. 16A is a perspective view of a first end of a counterweight showing an inner tube which extends through a cavity formed by an exterior of the counterweight.
Figure 16B:
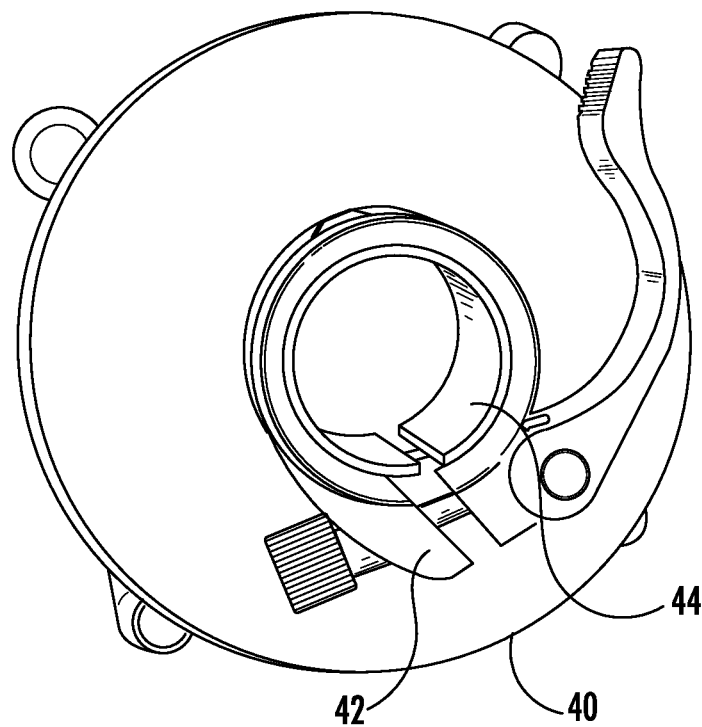
FIG. 16B is a perspective view of a second end of the counterweight showing a clamping member that can be used to secure the counterweight to a boom arm.

As seen in FIG. 4, a boom arm 30 has a counterweight 40 secured thereto. Counterweight 40 as seen in FIGS. 16A & 16B defines a central bore 44 there through that allows the counterweight 40 to be moved to various positions along the boom arm 30. A counterweight locking member 42, which may be in the form of a an adjustable tension clamp, will secure the counterweight 40 to a desired position on the boom arm 30 and allow for a way of adjusting the balance of the boom arm relative, to the weight of any structural supported items on the terminus of the boom arm. The counterweight 40 may be separated along a threaded cap portion 46 (FIG. 1) of the counterweight which allows for additional weights to be placed or removed within an interior of the counterweight. As best seen in reference to FIG. 16A, an interior cavity 48 can be seen when the end cap 46 has been removed.

Boom arm 30 may, be locked in a desired position using a clamp or set screw. One end of the boom arm defines a terminus that can receive any number of conventional attachment hardware and accessories such as a microphone or lighting equipment as seen in FIG. 15.

As seen in reference to FIG. 15, attachment hardware may include a quick release connector 90 which in turn may support a ball joint 92 that may be used to secure an additional connector 94 to further secure a microphone, a light, or lighting or sound accessories.

As seen in the figures, a boom stand 10 may comprise or consist of a vertical upright 20, the vertical upright 20 having a lower section 22 and an upper section 24, the lower section 22 defining a hollow interior and adapted for receiving a portion of a length of upper section 24 therein;

a first pneumatic actuator 26 operationally disposed within the lower section 22;

a second pneumatic actuator 28 operatively disposed within at least a portion of the upper section 24, the first pneumatic actuator 26 and the second pneumatic actuator 28 being in axial engagement with each other;

a clamping member 120 secured to one end of lower section 22 and having an engaging member 122 which supplies a variable securing force to one end of upper section 24;

a locking mechanism 50 having a first tubular connector 52 adapted for receiving a free end of upper section 24, the locking mechanism 50 further defining a second tubular connector 54 positioned above the first tubular connector 52;

a telescopic boom arm 30 inserted within the second tubular connector 54, the boom arm having a sliding counterweight 40, counterweight 40 having a locking member 42 to secure the counterweight 40 to the boom arm 30, a terminal end 34 of boom arm 30 defining an attachment member for supporting a microphone; and a wheeled base 60 having at least three wheels 62, each wheel 62 secured to a first end of a corresponding leg 64 and each respective leg 64 and wheel 62 combination positioned along a pivot 67 attaching a second end of each leg 64 to the base 60.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A manually operated boom stand comprising:
    a vertical upright, the vertical upright having a lower section and an upper section, the lower section defining a hollow interior and adapted for receiving a portion of the upper section therein;
    a first pneumatic actuator operatively disposed within the lower section;
    a second pneumatic actuator operatively disposed within the upper section, the first pneumatic actuator and the second pneumatic actuator being in an axial engagement with each other, a base of the first pneumatic actuator being secured to a base of the second pneumatic actuator;
    a clamping member secured to an upper end of lower section and having an engaging member which is configured to supply a variable securing force to the upper section;
    a locking mechanism operatively coupled to the upper section and including:
        a first tubular connector adapted for receiving an upper end of the upper section;
        a second tubular connector positioned above the first tubular connector and adjustable relative to the first tubular connector;
        a plate attached to the second tubular connector and having a plurality of apertures; and
        a spring tensioned pin adapted to engage any one of the plurality of apertures of the plate to lock the second tubular connector with respect to the first tubular connector; and
    a wheeled base operatively coupled to the lower section and including:

at least three legs, each of the at least three legs having a first end and a second end;

at least three wheels, each of the at least three wheels being secured to a bottom portion of the first end of a respective one of the at least three legs; and at least three pivot attachment members, the second end of each of the at least three legs being attached to a lower surface of the wheeled base via a respective one of the at least three pivot attachment members, each of the at least three legs being adapted for independent movement with respect to any other one of the at least three legs;

wherein the first pneumatic actuator and the second pneumatic actuator are adapted to operatively move the upper section within the hollow interior of the lower section thereby changing a height of the vertical upright relative to the wheeled base.

2. The manually operated boom stand according to claim 1 wherein the first pneumatic actuator and the second pneumatic actuator have different lifting forces.

3. The manually operated boom stand according to claim 1 wherein the second pneumatic actuator has a lower lifting force than the first pneumatic actuator.

4. The manually operated boom stand according to claim 1 further comprising:

a boom arm inserted within the second tubular connector.

5. The manually operated boom stand according to claim 4 further comprising:

a sliding counterweight operatively coupled to the boom arm, the sliding counterweight having a locking member to secure the sliding counterweight to the boom arm.

6. The manually operated boom stand according to claim 4 wherein the boom arm defines an attachment member for supporting a microphone.

7. A boom stand comprising:

a vertical upright, the vertical upright having a lower section and an upper section, the lower section defining a hollow interior and adapted for receiving a portion of the upper section therein;

a first pneumatic actuator operatively disposed within the lower section;

a second pneumatic actuator operatively disposed within the upper section, the first pneumatic actuator and the second pneumatic actuator being in an axial engagement with each other, a base of the first pneumatic actuator being secured to a base of the second pneumatic actuator;

a locking mechanism operatively coupled to the upper section and including:

a first tubular connector adapted for receiving an upper end of the upper section;

a second tubular connector positioned above the first tubular connector and adjustable relative to the first tubular connector;

a plate attached to the second tubular connector and having a plurality of apertures; and a spring tensioned pin adapted to engage any one of the plurality of apertures of the plate to lock the second tubular connector with respect to the first tubular connector; and a wheeled base operatively coupled to the lower section and including:

at least three legs, each of the at least three legs having a first end and a second end;

at least three wheels, each of the at least three wheels being secured to a bottom portion of the first end of a respective one of the at least three legs; and at least three pivot attachment members, the second end of each of the at least three legs being attached to a lower surface of the wheeled base via a respective one of the at least three pivot attachment members, each of the at least three legs being adapted for independent movement with respect to any other one of the at least three legs;

wherein the first pneumatic actuator and the second pneumatic actuator are adapted to operatively move the upper section within the hollow interior of the lower section thereby changing a height of the vertical upright relative to the wheeled base.

8. The boom stand according to claim 7 wherein the first pneumatic actuator and the second pneumatic actuator have different lifting forces.

9. The boom stand according to claim 7 wherein the second pneumatic actuator has a lower lifting force than the first pneumatic actuator.

10. The boom stand according to claim 7 further comprising:

a boom arm inserted within the second tubular connector.

11. The boom stand according to claim 10 further comprising:

a sliding counterweight operatively coupled to the boom arm, the sliding counterweight having a locking member to secure the sliding counterweight to the boom arm.

12. The boom stand according to claim 10 wherein the boom arm defines an attachment member for supporting a microphone.

13. A process of operating a boom stand, the process comprising:

providing a vertical upright, the vertical upright having a lower section and an upper section, the lower section defining a hollow interior and adapted for receiving a portion of the upper section therein;

providing a first pneumatic actuator, the first pneumatic actuator being operatively disposed within the lower section;

providing a second pneumatic actuator, the second pneumatic actuator being operatively disposed within the upper section, the first pneumatic actuator and the second pneumatic actuator being in an axial engagement with each other;

providing a clamping member, the clamping member retaining the upper section within the hollow interior of the lower section;

providing a locking mechanism, the locking mechanism being operatively coupled to the upper section and including:

a first tubular connector adapted for receiving an upper end of the upper section;

a second tubular connector positioned above the first tubular connector and adjustable relative to the first tubular connector;

a plate attached to the second tubular connector and having a plurality of apertures; and a spring tensioned pin adapted to engage any one of the plurality of apertures of the plate to lock the second tubular connector with respect to the first tubular connector;

providing a wheeled base, the wheeled base being operatively coupled to the lower section and including:

at least three legs, each of the at least three legs having a first end and a second end;

at least three wheels, each of the at least three wheels being secured to a bottom portion of the first end of a respective one of the at least three legs; and at least three pivot attachment members, the second end of each of the at least three legs being attached to a lower surface of the wheeled base via a respective one of the at least three pivot attachment members, each of the at least three legs being adapted for independent movement with respect to any other one of the at least three legs;

releasing the clamping member;

raising the upper section with an upwardly directed force exerted by the first pneumatic actuator and the second pneumatic actuator, thereby extending the upper section with respect to the lower section; and tightening the clamping member when the upper section is in a desired extended position, thereby securing the upper section with respect to the lower section.

14. The process according to claim 13 wherein the first pneumatic actuator and the second pneumatic actuator have different lifting forces.

15. The process according to claim 13 wherein the second pneumatic actuator has a lower lifting force than the first pneumatic actuator.

16. The process according to claim 13 further comprising:
providing a boom arm, the boom arm being inserted within the second tubular connector.

17. The process according to claim 16 further comprising:
providing a sliding counterweight, the sliding counterweight being operatively coupled to the boom arm, the sliding counterweight having a locking member to secure the sliding counterweight to the boom arm.

18. The process according to claim 16 wherein the boom arm defines an attachment member for supporting a microphone.

* * * * *